(12) United States Patent
Neuberger

(10) Patent No.: US 6,724,963 B2
(45) Date of Patent: Apr. 20, 2004

(54) METHOD AND APPARATUS FOR MANUFACTURING PARTIALLY DIFFUSING OPTICAL FIBERS

(75) Inventor: Wolfgang Neuberger, Labuan (MY)

(73) Assignee: CeramOptec Industries, Inc., East Longmeadow, MA (US)

( * ) Notice: Subject to any disclaimer, the term of this patent is extended or adjusted under 35 U.S.C. 154(b) by 0 days.

(21) Appl. No.: 10/022,053

(22) Filed: Dec. 17, 2001

(65) Prior Publication Data

US 2003/0113082 A1 Jun. 19, 2003

(51) Int. Cl.⁷ .............................. G02B 6/02; G02B 6/16; C03B 37/02; C03B 37/07; C03C 25/00
(52) U.S. Cl. ........................ 385/123; 385/31; 65/378; 65/385; 65/392; 65/394; 65/485
(58) Field of Search ......................... 385/31, 100, 123, 385/124; 65/378, 385, 391, 392, 394, 433, 485; 264/1.1, 1.24, 1.27, 1.28, 1.29

(56) References Cited

U.S. PATENT DOCUMENTS

| | | | |
|---|---|---|---|
| 3,508,589 A | | 4/1970 | Derick et al. |
| 4,587,065 A | * | 5/1986 | Kouichi et al. .............. 264/1.5 |
| 5,737,472 A | | 4/1998 | Bernasson et al. |
| 5,781,679 A | | 7/1998 | Li et al. |
| 5,905,837 A | | 5/1999 | Wang |
| 6,044,191 A | | 3/2000 | Berkey et al. |
| 6,502,428 B1 | * | 1/2003 | Onishi et al. ................. 65/378 |
| 6,539,154 B1 | * | 3/2003 | Berkey et al. .............. 385/123 |

FOREIGN PATENT DOCUMENTS

| | | |
|---|---|---|
| WO | WO 99/23041 | 5/1999 |
| WO | WO 00/79319 | 12/2000 |

* cited by examiner

Primary Examiner—Gerard Strecker
(74) Attorney, Agent, or Firm—BJ Associates; Bolesh J. Skutnik

(57) ABSTRACT

The present invention provides for an apparatus and method to manufacture optical fiber in a way that produces controlled and patterned diffusion of optical radiation along its length. The novelty of the described invention is that the patterns of diffusion are produced at the time the optical fiber is manufactured. The "in-line" manufacturing method avoids the need for post-production treatment of the fiber, which makes the process highly efficient and economical. Light diffusing optical fibers of significant length can be produced. Several manufacturing configurations to achieve the desired effects and their inclusion in the fiber production process are described. The processes can be configured to process optical fibers constructed from a wide variety of known glass, polymeric or other materials. The partially diffusing optical fibers of this invention have applications ranging from illuminated fabrics and toys and to lighting systems and medical instruments. A distributed sensor comprising a light detector coupled to a partially diffusing fiber is also disclosed.

15 Claims, 4 Drawing Sheets

METHOD AND APPARATUS FOR MANUFACTURING PARTIALLY DIFFUSING OPTICAL FIBERS

BACKGROUND OF THE INVENTION

1. Field of the Invention

The present invention relates to illuminating optical fibers and manufacturing processes to produce optical fibers having patterned light diffusion sites along the length of the fibers.

2. Information Disclosure Statement

The radiation emitted by a laser beam source can be coupled into an optical fiber of suitable dimensions and optical properties wherein the light can be transported with no significant losses over very long distances. Today's state of the art fibers have found broad application in the fields of telecommunication, optical inspection, medical therapy, laser applications and many more. The fabrication processes are well understood and optical fibers are manufactured in large quantities at high quality providing lifetimes up to over one million hours.

Optical fibers rely on total internal reflection at the interface between the fiber core and the surrounding cladding to contain the light within the core of the fiber. The light guiding effect occurs in optical fibers where cores are much larger than the wavelength of the incident light. For light guiding to occur, the refractive index of the fiber cladding must be lower than the refractive index of the fiber core. A light ray incident to the fiber core's end under an angle sufficiently small relative to the fiber axis can enter the fiber and is refracted according Snell's law into a certain angle. It then hits the interface between fiber core and cladding and is, assuming the angle of incidence to the surface is sufficiently large, totally reflected back into the core. If no bends occur that exceed a critical curvature, the light cannot leave the fiber core and is thus guided through the fiber until it reaches the end. If the core is small, typically in the range of a few multiples of the wavelength of the radiation that is to be coupled into the fiber, the light guiding effect can be easier understood in terms of a wave guiding.

The fiber is an optical system wherein light propagation is possible only in distinct Eigenmodes. These modes can be excited by incident light and then propagated through the fiber. All light guiding effects in optical fibers share a common feature, the optical field is not completely confined to the fiber core. Slight parts of the radiation lap into the fiber cladding; known as an "evanescent field" to people skilled in the art. This evanescent field does not necessarily contribute to the damping of the fiber, but it can significantly influence the guiding and mode properties.

Since it is possible to couple into fibers the radiation of high power light sources, such as diodes and laser beams, one can think of applying specially manufactured illuminating fibers in a wide variety of applications.

Normally the goal of the fiber manufacturing process is to minimize the fiber's intrinsic losses. Illuminating fibers show a different behavior than conventional fibers, because their optical loss is not usually as small as possible but well defined over the length of the fiber. This is realized by manufacturing the fiber in such a manner that a certain amount is coupled out of the fiber's radiation guiding core and is diffused into the fiber cladding, from where it is scattered. The fiber cladding appears to be illuminated. Illuminating fibers of this simple kind can be manufactured in several ways.

For polymer cladded fibers, one method treats the fiber chemically while still uncoated so that the core's surrounding becomes rough and thus diffuses a certain part of the light being totally reflected at the core/cladding interface. This method has several disadvantages. It is a very rough method and can only be slightly regulated, thus the illumination effect will vary strongly with the length of the fiber. The technique cannot be used with glass cladded fibers.

Another method utilizes the scattering effect of several substances added to the basic material from which the fiber is manufactured. This permits a very homogeneous doping of the fiber core. Similarly, the polymer cladding can contain a dopant material, from which parts of the evanescent field are scattered so the fiber appears illuminated. This method can produce a uniform diffusion, but does not permit a patterned diffusion along the fibers length.

Although uses for illuminating fibers are suggested in the prior art, few discuss the use of partially diffusing fibers as an economical means to achieve the desired end products.

U.S. Pat. No. 3,508,589 describes luminous textile products made luminous by incorporating optical fibers, which have been enhanced to "frustrate total reflection". Methods discussed are the disruption of the internal reflecting surfaces by roughening the surface of the unsheathed core by etching, grit blasting or abrading. It would be economically advantageous be able to produce the patterned diffusive properties at the time the fiber was manufactured. The methods described could not be used for a glass cladded fiber.

Since state of the art fibers have uniform scattering rates according to their fabrication process, a necessary requirement to realize the above mentioned applications is a manufacturing method to produce long lengths of diffusing optical fibers with tailored properties, especially concerning their scatter rates.

U.S. Pat. No. 5,737,472 describes an optical fiber with multiple point lateral illumination. The method that the invention proposes is treating a fiber of length on the order of several meters, to produce an appearance of uniformity or quasi-continuous luminosity. The illumination is accomplished by numerous, closely spaced degradations on the fiber surface. The number and size of the degradation are a function of their distance from the illumination source. The degradations are obtained by sandblasting or attack by an aerosol solvent. The patent describes several methods of maintaining uniform illumination. These include changing the sandblaster characteristics as a function of fiber length and using a photocell to measured the intensity of perceived light at the sandblast site, which controls the speed of the fiber. In one embodiment of the invention, the optical fiber includes several treated areas separated by non-treated areas. The invention illustrates a spool-to-spool (fixed length) post-draw process and is not suitable for very long lengths of fibers.

U.S. Pat. No. 5,905,837 describes a method to controllably tap and distribute light propagating through an optical fiber. The invention comprises an optical fiber having multiple cross-sectional regions each having a different index of refraction. When light passing through the fiber reaches the interface where the refractive index changes, the light traversing the fiber is diverted out of the optical fiber through the side of the fiber. Refractive regions and reflective layers help to direct light out of the fibers. Prisms may advantageously be applied to the exit side of the fiber to focus the light for use. The invention primarily relies on dispersive elements in the optical fiber material, reflective elements and prisms. The reflective and prismatic elements are not derived from the fiber itself. It does not suggest the advantageous treatments of the cladding or combinations of core and cladding. The patent does not describe or suggest a continuous in-line operation integrated into the production of the fiber.

U.S. Pat. No. 5,781,679 describes an apparatus for tapping and dispersing light from an optical fiber. The invention comprises mirrors constructed from the optical fiber itself through a series of micro-cutting, masking, coating and refilling operations. Dispersive elements are added to the refilling material before it is placed within the cut region of the fiber. The cut and refilled regions act as a tap allowing diffused light to exit the optical fiber. The invention does not describe or suggest producing the light-dispersing fiber in a continuous process nor does it discuss the treatment of a fiber cladding for enhanced illumination effects.

U.S. Pat. No. 6,044,191 discloses a single-mode optical waveguide fiber having variations in properties that provide dispersion that varies along the length of the waveguide. One embodiment describes a core preform having sections of reduced diameter. Several techniques for changing the diameter of the core are heated stretching, grinding, polishing, etching, and laser ablation. The core is then overcladded. In another embodiment, the refractive index of the core is varied by irradiation or bombarding the waveguide with sub-atomic particles. The treatment is done after the fiber has passed out of the furnace and before it has received a polymer coating. The patent does not describe the advantage of using multimode fibers for illumination. The patent does not disclose the advantageous modification of both the core and cladding, and avoids treatments within the hot production zone.

PCT Application WO 99/23041, published May 14, 1999, discloses a fiber optic diffuser in which the scattering elements are generated by an optical damage process to the core of an optical fiber using pulsed lasers. Multiple small scattering centers are created in the core. The scattering centers consist of small regions of optically damaged core, which have the characteristic of scattering light. During manufacture of a diffuser, the irradiance distribution being created is measured using an emission source attached to the proximal end of the optical fiber opposite the diffuser end. Creation of scattering sites is detected by optical output detection at the distal end of the fiber. Although the patent does describe non-uniform or customized diffuser emission profiles, it does not describe a continuous in-line operation integrated into the production of the fiber. It does not suggest combination treatments of both the core and cladding in a single process.

PCT Application WO 00/79319, published Dec. 28, 2000, describes an optical fiber diffuser with pre-selected light intensity distributions along the length of the diffuser. Irradiating the fiber core with high power UV light through an amplitude mask or a phase mask preferably produces the scattering centers of the fiber diffusers. The method describes removing a buffer layer that coats the cladded core in areas where a proposed diffuser is to be created followed by a buffer recoat. The patent also teaches that multimode fibers are preferred over single mode to give significantly higher emitted light intensities. The invention does not suggest treatment of the cladding to enhance light diffusion. The patent does not disclose a method to produce commercially long lengths (in excess of several meters) of partially diffusing optical fibers.

All the prior art production of illuminating fibers is performed on relatively short lengths and generally requires secondary operations to make the fiber light diffusing. Prior art operations to produce partially diffusing optical fibers all occur outside the hot production zone. In view of the large-scale applications of partially diffusing optical fibers, there is still a need for a method to produce optical fibers having integrally formed light diffusers and in commercial lengths.

OBJECTIVES AND BRIEF SUMMARY OF THE INVENTION

It is an object of the present invention to provide an apparatus to manufacture custom optical fibers having selected areas of light diffusion along their length.

It is another object of the present invention to provide a method to manufacture partially diffusing optical fibers through an inline continuous operation.

It is another object of the present invention to provide a process that is capable of producing partially diffusing optical fibers having significant lengths in an efficient and economical manner It is yet another object of the present invention to provide an apparatus having several different means to enhance the light diffusive properties of an optical fiber in selected areas along a continuous length.

It is a further object of the present invention to provide a light diffusing optical fiber with controlled patterns of diffusion per length segment.

Briefly stated the present invention provides for an apparatus and method to manufacture optical fiber in a way that produces controlled and patterned diffusion of optical radiation along its length. The novelty of the described invention is that the patterns of diffusion are produced at the time the optical fiber is manufactured. The "in-line" manufacturing method avoids the need for post-production treatment of the fiber, which makes the process highly efficient and economical. Light diffusing optical fibers of significant length can be produced. Several manufacturing configurations to achieve the desired effects and their inclusion in the fiber production process are described. The processes can be configured to process optical fibers constructed from a wide variety of known glass, polymeric or other materials. The partially diffusing optical fibers of this invention have applications ranging from illuminated fabrics and toys to lighting systems and medical instruments. A distributed sensor comprising a light detector coupled to a partially diffusing fiber is also disclosed.

The above and other objects, features and advantages of the present invention will become apparent from the following description read in conjunction with the accompanying drawings, (in which like reference numbers in different drawings designate the same elements.)

DETAILED DESCRIPTION OF PREFERRED EMBODIMENTS

Figure 1:
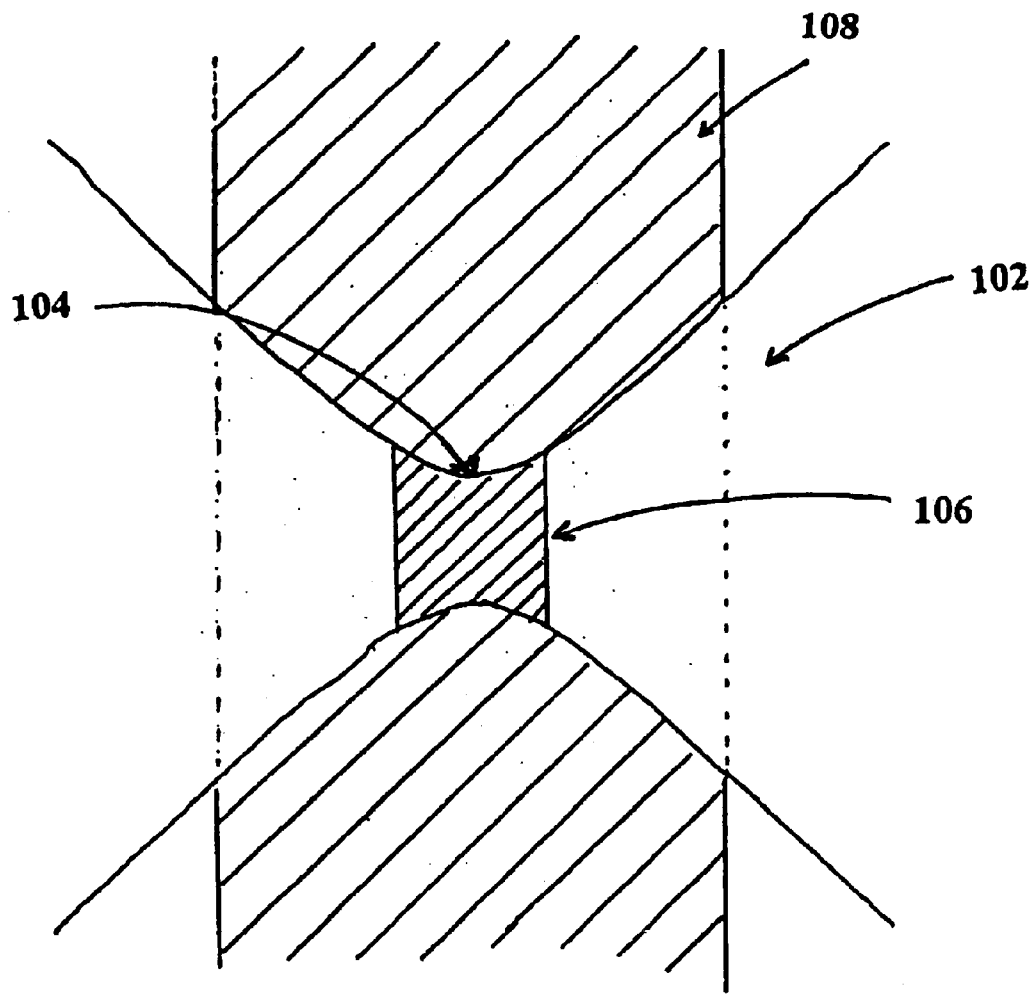
FIG. 1 illustrates the focal point of a high-energy laser.

Typical applications of illuminating fibers are originated from several tasks. One such task is illumination in highly dangerous or explosion sensitive environments. Mining operations, fueling depots, oilrigs, boats and aircraft all have potentially explosive vapors associated with them. They all require lighting for standard illumination and specialty lighting for emergency exit paths. Partially illuminating fibers are an optimal solution to this problem. They are safe in potentially explosive environments since they are not dependant on local electricity and do not involve explosion causing elements, like high voltage switches. By only being partially diffusing, the fiber optic light paths can have unique properties Another field of application is the safe illumination of sensitive objects. As an example, paintings in museums tend to degenerate due to the effect of high-energy radiation in the ultraviolet range impacting on them and destroying the colors. Since nearly any conventional lamp generates this radiation, high performance filters must be applied in order to protect the paintings and to achieve a white illumination. Diffuse optical fiber illumination would provide significant advantages compared to conventional lighting. Utilizing laser light sources, fiber optics can produce illumination that is extremely monochromatic with no UV components.

There are many other advantages to using partially illuminating fibers. Since light bulbs do not need replacing, maintenance costs will be reduced. Since the lighting is more efficient, energy costs are reduced. Since there are no energy sources at the illumination site, the risk of fire is reduced.

An alternative use for optical fibers having partially diffusing properties is that of a distributed sensor. In as much as light can diffuse out of the fiber at the selected sites, light energy can also enter the fiber at the same sites. One can create a distributed sensor by coupling a light detector to the end of a partially diffusing fiber. The fiber is then placed in an area that needs to be monitored. By detecting changes in the light or shadow that hits the diffusing sites, very large areas, especially perimeters, can be monitored. Such a system could be used to monitor people crossing a boundary, insufficient lighting in parking lots, or lights that have been left on in a large warehouse.

Partially diffusing optical fibers produced according to the present invention are produced in lengths ranging from several hundred to several thousand yards. These partially diffusing fibers can be used in these commercial lengths, or segments of the fibers having a desired diffusion pattern and distribution can be cut to custom lengths at a time of use.

As described earlier, the standard methods of fabricating illuminating fibers are not applicable as a process to produce segmented high performance illuminating fibers, because the methods only allow fabrication of fibers with a homogeneous scattering rate per length segment in the fiber. A second process is required to produce light scattering elements in either the fiber core or the fiber cladding near the evanescent field of the core. These elements allow an out-scattering effect of the radiation into the fiber cladding or coating to generate an illumination effect.

The applications previously described require partially diffusing optical fibers of great length. Several methods and apparatuses are presented which allow the manufacturing of such fibers.

The standard process for producing optical fiber consists of heating a preform in an oven. An optical fiber is drawn out of the preform in an extremely precise manner. A clean tube may be used to protect the fiber from contamination. From its origin, the optical fiber must pass a certain distance where it cools down. Along this passage several diffusion enhancement steps can be included into the manufacturing process to produce enhanced fiber having diffusion sites along its length. This in-line treatment is the focus of the present invention. Optical diffusion enhancement can be realized by several means. Possible are a treatment of the cladding, manipulations to the fiber core or core/cladding interface, or means applied to the cladding or coating or the fiber in general. Extending the length of the tube and placing additional heating sources along its length will keep the fiber hot and more susceptible to inline treatments. With a highly precise system, radial diffusion paterns, Bragg gratings, gradient index and step index patterns may be created.

Diffusion of metallic dopant into the fiber by surface deposition followed by annealing is one method to introduce impurities into the fiber. Although this is a widely used technique for changing refractive indexes, it is limited to producing index gradient guides and cannot produce step index having clearly defined refractive index regions. The diffusion of the dopant will be a function of the annealing temperature, annealing time and thickness of the dopant layer. Although this treatment is not fully discussed here, it is considered an optional treatment in the overall scope of this present invention.

Particle-implantation and preferably ion-implantation provide a preferred method to manipulate the fiber core and cladding. Since it is generally much easier to accelerate ions to high energies, the ion implantation method will be discussed in this preferred embodiment. In order to achieve controlled implantation, the treatment tube containing the fiber must be evacuated and doping particles accelerated and impacted onto the fiber core. The particle energy can be controlled in a wide range and the velocity distribution is very sharp, contrary to atomic rays that are of thermal origin. Due to their small size and high energy they enter the core material where they loose their kinetic energy and form a homogeneous distribution therein. The concentration of the implanted particles is dependent on their original energy, their size and the particle flow, per unit time (i.e. the particle number impacting onto the fiber-element passing the implanter). The varying concentration of scattering particles allows one to generate the desired, variable scattering and thus the varying illumination of the fiber. Furthermore, it is possible to use more than one kind of particle to generate advanced effects. Ion implantation has the advantage of permitting precise control of the location and quantity of impurities, which makes it possible to produce step index optical guides Another preferred embodiment of the present invention incorporates one or more lasers to fabricate partially diffusing illuminating fibers. By strong focusing of the laser beam and working with short pulse high-energy systems, it is possible to generate defects inside the bulk of transparent fibers as well as the fiber's cladding or coating. The processes described can be configured to process optical fibers constructed from a wide variety of known glass, polymeric or other materials.

Referring to FIG. 1, a focused laser beam provides a varying intensity along the focusing curve 102. At focus point 104 the laser intensity is at a maximum. The laser power must be designed such that only in a short region 106 around focus point 104 is the intensity sufficiently large to cause defects, in order to confine them to a small region. This improves the scattering behavior and minimizes the risk of destroying fiber 108. Since every pulse of the manipulation laser causes a predictable defect, the defect density can be arbitrarily changed without statistical variations, unless defect density is so large that the fiber becomes unstable. Thus, the degree of illumination can be predetermined.

Another preferred embodiment consists of irradiating the optical fiber with high-energy lasers, preferably operating in the ultraviolet wavelength range. Excimer lasers or frequency converted solid state or gas lasers, preferably providing short pulses from nanoseconds down into the femtosecond range, can treat the cladding of the fiber instead of the optical fiber's core. Normally the cladding has a very high surface quality at the interface with the core to prevent scattering losses. The laser application changes the surface quality gradually depending on the laser power and energy. With the degree of surface damage, the light scattering degree also changes and a precise illumination pattern can be achieved.

Other methods to change the optical fiber surface can also be applied. Chemical means, such as etching to degrade the surface of the optical fiber, may be applied. However, these methods bear the risk of contamination and must therefore be implemented carefully. Chemical methods would preferably be realized by reactive ion etching means, which are state of the art in the semiconductor industry, where they are used to manufacture complex integrated elements with a multitude of layers.

The processes described occur in the hot production zone prior to application of a protective coating. Inside the zone the fiber is extremely sensitive to flaw formation if touched by foreign objects so care must be taken not to apply other than longitudinal forces onto the fiber. The heating elements incorporated in the described production systems are also capable of inducing diameter changes in the fiber. In order to obtain fast processing, it is not possible to operate with conventional heat generating means, such as IR lamps or fuel induction furnaces. Heating devices must have high heat impact on the fiber in a short period of time. Naturally, the mode and operating temperatures of the heating devices will depend on the composition of the materials being drawn.

Although single laser, ion-implantation, and chemical treatment devices are illustrated in the following examples, multiple units (not shown) of any of the devices may also be used. The lasers could operate at the same or different wavelengths, different ion types may be used, and the chemicals could vary to achieve a variety of results. The multiple devices of each type can be positioned at different points along the length of the hot zone or at selected angles around the axis of the fiber. To selectively pattern the diffusion zones along the length of the fiber, it is envisioned that a computer or other type of programmable controller would coordinate the various fiber enhancement devices along with the fiber draw speed.

It is also envisioned that some treatments, such as with high power laser, may also occur after the fiber exits the hot zone. If the protective coating is sufficiently transparent to laser light, additional enhancement to the core or cladding can be obtained. The requirement being that the processes occur in-line as part of a continuous process.

The present invention is further illustrated by the following examples, but is not limited thereby.

Figure 2:
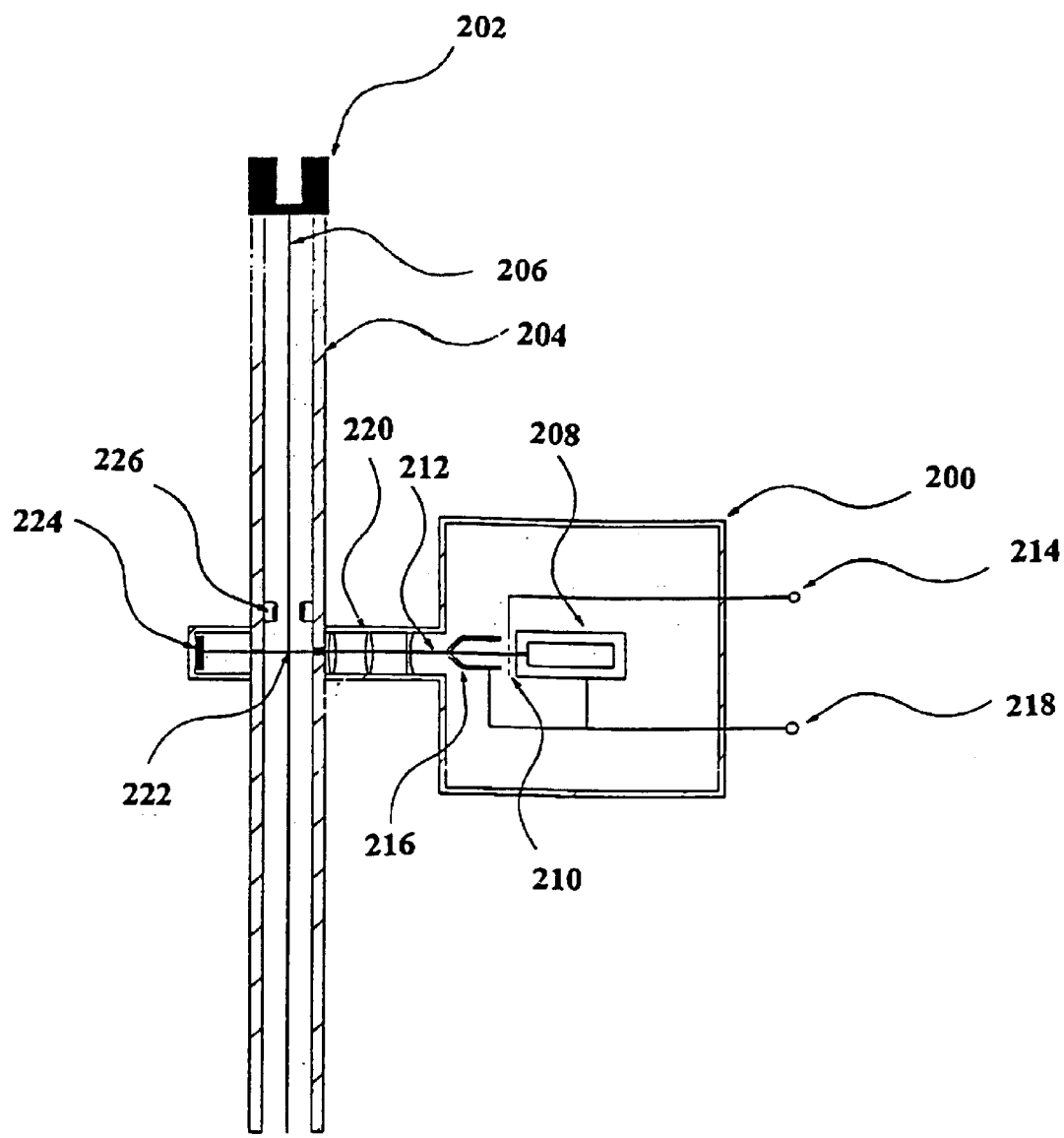
FIG. 2 illustrates an in-line ion implantation device.

In a preferred embodiment, one or more ion-implantation units are used to fabricate partially diffusing fibers. Referring to FIG. 2, a preform of starting material is heated in oven 202 to form a zone of molten preform. The whole system is encased in clean tube 204 to prevent contamination of fiber 206. Optical fiber 206 is drawn out of the zone of molten preform in an extremely precise manner through clean tube 204. Ion-implanter unit 200 is attached to the fiber tube 206. Implanter unit 200 consists of particle source 208 with means for particle acceleration. This is easily obtained by grid 210 connected to a high voltage source 214 producing exactly the opposite potential to the particle charge in order to attract beam particles 215 from source 208 and let them pass through grid 210. Cylinder system 216 connected to voltage source 218 of a negative potential relative to the ions' charge to the repel them is used as a beam collimation and direction means. Ion beam 212 can now pass several electric field generation means 220 that serve as lens systems and thus are illustrated in this manner to obtain a beam shape optimized to fiber 206 that is to be impacted by ion beam 212.

Since not all ions are implanted into fiber 206 at impaction point 222, beam dump 224 completes the system. Additionally, heating means 226 can be included in tube 204 around impaction point 222, since for several kinds of particles the implantation quality is dependant on the substrate temperature. A computer or other comparable device (not shown) is preferably used to control the draw speed of the fiber, implantation treatment and heating means in order to produce a fiber with desired optical diffusing properties.

Figure 3:
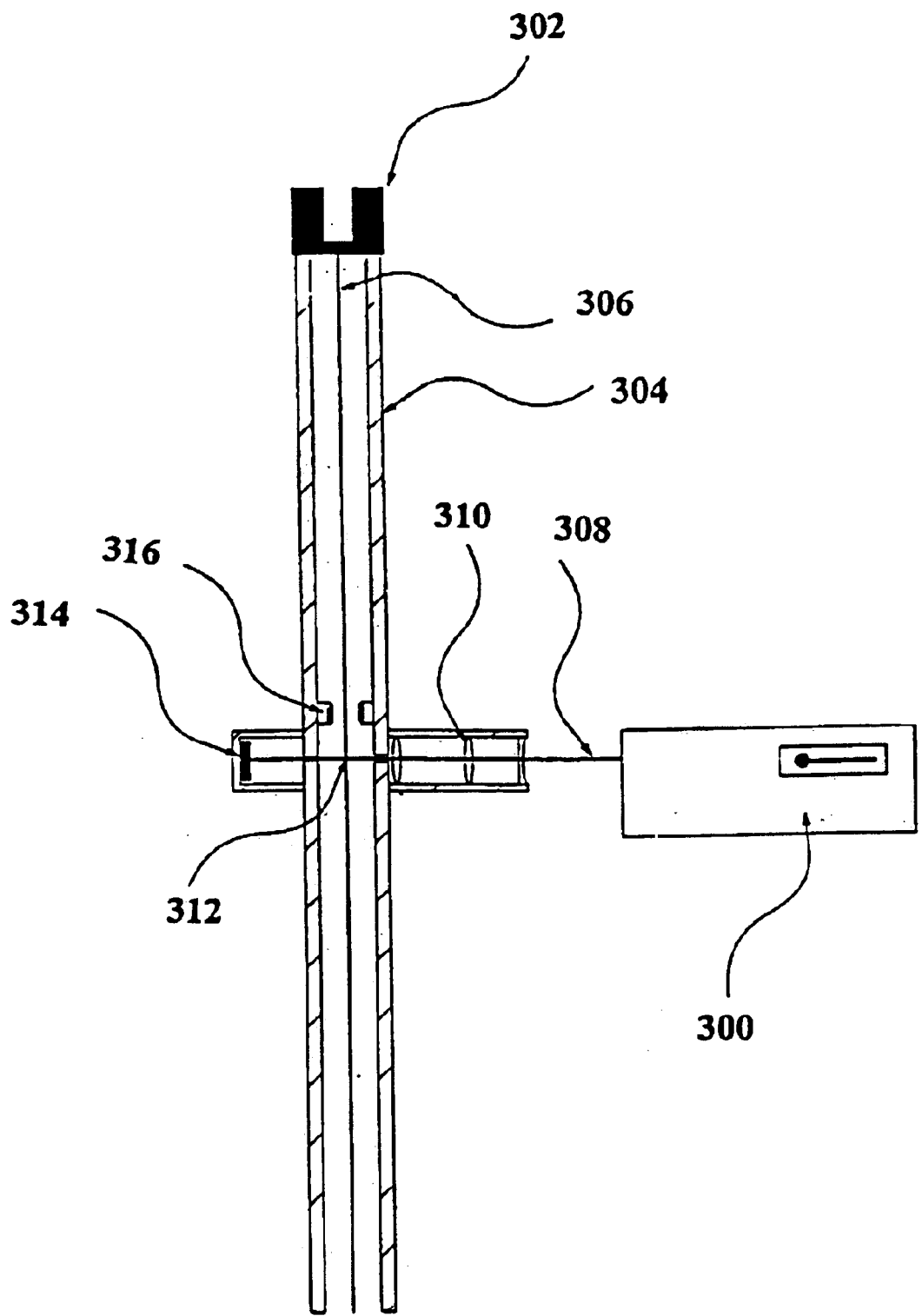
FIG. 3 illustrates an in-line laser device.

Another preferred embodiment of the present invention incorporates one or more lasers to fabricate partially diffusing illuminating fibers. By strong focusing of the laser beam and working with short pulse, high-energy systems it is possible to generate defects inside the bulk of a transparent fiber. FIG. 3 shows the inclusion of a laser manipulation source into the manufacturing process. Since a laser beam can be coupled through quartz windows, the setup is of less complexity than the inclusion of an ion implantation facility into fiber tube 304. It is even possible to work without tube evacuation. As in FIG. 2, a preform is heated in oven 302 and fiber 306 is drawn through clean tube 304. Laser beam 308 originates from laser source 300 and is suitably shaped by optical system 310 in order to obtain previously described focal point 104, which is illustrated in FIG. 1. From interaction zone 312, beam 308 is guided into beam dump 314. As before, heating elements 316 may be included in the process to condition the fiber for enhancement.

As previously described, by selecting an appropriate laser source, intensity and focus, the diffusing characteristics of the fiber cladding, coating or core/cladding interface may also be additionally or selectively enhanced.

Figure 4:
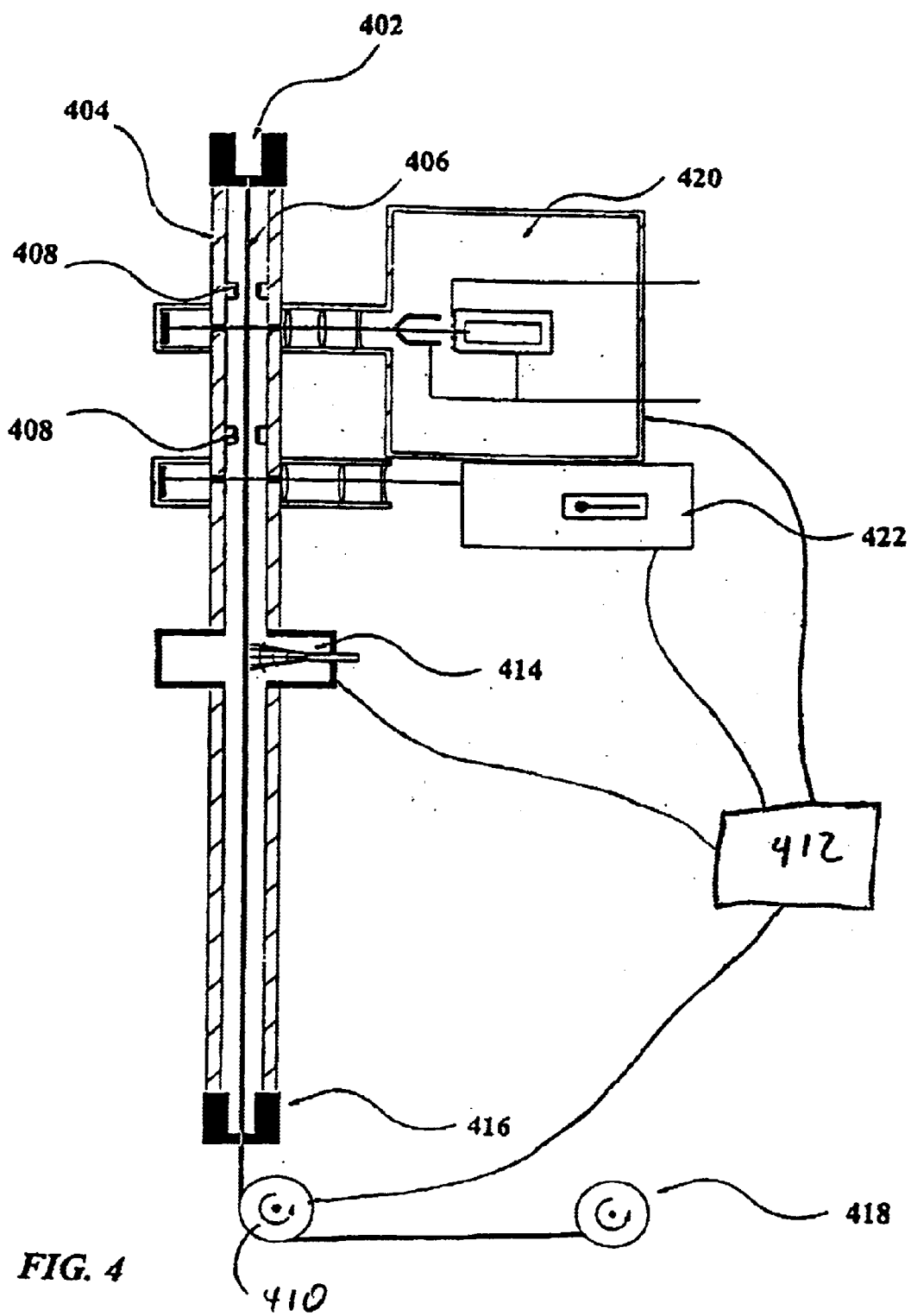
FIG. 4 illustrates an in-line combination of ion-implantation, laser and chemical treatment used to produce a partially diffusing illuminating fiber.

In a most preferred embodiment, several fiber enhancement devices are brought in-line to produce a continuous length of partially diffusing optical fiber. FIG. 4 illustrates the general setup of a preferred apparatus for producing partially diffusing optical fibers. The starting point is oven 402 from which a zone of molten preform is drawn via drawing means 410 to produce optical fiber 406 through clean tube 404 that protects fiber 406 from pollution. Tube 404 maybe evacuated to allow the various process steps for the fiber manufacturing. Heating elements 408 can be used to change fiber 406 diameter for each unit length element. Heating elements 408 further serve to prepare the fiber for enhancement by ion-implanter 420 or laser 422. The details of these processes have been described in previous preferred embodiments. Vapor unit 414 serves to generate a second cladding if desired, or may be used to otherwise chemically treat fiber 406. This second cladding can fulfill scattering operations or contribute to higher fiber performance in general. Earlier described processes for fiber enhancement may also be included or repeated after the vapor-coating step. Drawing means 410. Ion-implanter 420, laser 422, vapor unit 414, and any other enhancement device may be optionally connected to a controller such as computer 412 to control draw speed and control the enhancement means to create desired patterns along the fiber. Finally, fiber 406 is provided with a polymer coating by coating means 416. The polymer must be appropriately chosen in order to withstand the scattered radiation and to enhance the fiber flexibility. Polymer-coated partially diffusing fiber 418 of commercial lengths can then be prepared for end use.

Other types of chemical treatment devices, such as sprayers and surface deposition devices may also be included as described. Abrasion devices may also be included in the process after the fiber has cooled, but before the protective polymer coating has been applied.

Having described preferred embodiments of the invention with reference to the accompanying drawings, it is to be understood that the invention is not limited to the precise embodiments, and that various changes and modifications may be effected therein by those skilled in the art without departing from the scope or spirit of the invention as defined in the appended claims.

What is claimed is:

1. An in-line production method to manufacture a partially diffusing optical fiber, having numerous longitudinally spaced illumination sites, comprising the continuous steps of:
    a) heating a preform starting material in an oven to form a zone of molten preform,
    b) drawing said molten preform zone to form an untreated optical fiber,
    c) treating said untreated optical fiber with at least one means for diffusion enhancement while said fiber is still continuous with said molten zone, to produce an enhanced optical fiber having diffusion sites,
    d) repeating said treatment along a desired length of said fiber to form a desired pattern of said diffusion sites prior to severing said enhanced fiber from said untreated fiber; and
    e) providing a protective outer coating to said enhanced optical fiber having diffusion sites producing said partially diffusing optical fiber.

2. The method according to claim 1, wherein said means to enhance the diffusion is selected from the group consisting of particle implantation, ion-implantation, high-energy laser, chemical, surface deposition, abrasion, and heating.

3. The method according to claim 1, wherein said means for diffusion enhancement are applied in selected combinations to treat said optical fiber.

4. The method according to claim 1, wherein said means for diffusion enhancement create patterns selected form a group consisting of random, radial, Bragg gratings, gradient index, step index and custom patterns.

5. The method according to claim 1, wherein all diffusion enhancement of said fiber is performed in a hot zone of said process prior to said fiber being coated with a polymer coating.

6. The method according to claim 1, wherein at least some diffusion enhancement is performed inside a hot zone of said process and at least some diffusion enhancement is performed outside said hot zone.

7. The method of according to claim 1, wherein said untreated optical fiber is drawn through a clean tube upon leaving said molten zone to protect said untreated optical fiber from contamination.

8. An apparatus for in-line manufacturing a partially diffusing optical fiber comprising:
    means to melt a fiber optic preform starting material;
    means to draw said preform into a fiber, wherein said drawing means is in series with said melting means;
    means to protect said fiber from contamination until a protective coating is applied in-line, said means surrounding said fiber;
    means to control fiber draw speed in electro/optical connection to said drawing means;
    means to maintain a hot zone after said melt zone;
    at least one means to enhance diffusion in said fiber and positioned along a length of said protection means and proximate to said fiber;
    means to control said diffusion enhancement sections along said fiber's length; and
    means to apply said protective coating of said partially diffusing optical fiber.

9. The apparatus according to claim 8, wherein said means to protect said fiber from contamination is a clean tube.

10. The apparatus according to claim 8, wherein said means to enhance diffusion is selected from a group consisting of particle implanters, ion-implanters, high-energy lasers, chemical vaporizers, chemical sprayers, surface deposition devices, abrasion devices, and heaters.

11. The apparatus according to claim 10, wherein said means to enhance diffusion are positioned along a length of said fiber and axially about said fiber.

12. The apparatus according to claim 8, wherein the means to control fiber draw speed and means to control diffusion enhancement means is a computer.

13. A partially diffusing optical fiber produced by the in line production method according to claim 1, where said fiber is produced in commercial lengths.

14. The partially diffusing optical fiber according to claim 13, wherein said fiber is cut to custom lengths at time of use.

15. A distributed sensor comprising a light detector coupled to a partially diffusing fiber, produced according to the in line production method of claim 1, wherein light energy entering said diffusing fiber is monitored to provide information about an environment where said diffusing fiber is placed.

* * * * *